US012766944B2

(12) United States Patent
Kemble

(10) Patent No.: US 12,766,944 B2
(45) Date of Patent: Oct. 20, 2026

(54) SUPPORT ASSEMBLY FOR RADIATORS OF WORK MACHINES

(71) Applicant: Caterpillar Inc., Peoria, IL (US)

(72) Inventor: Paul Kemble, Leicestershire (GB)

(73) Assignee: Caterpillar Inc., Peoria, IL (US)

( * ) Notice: Subject to any disclaimer, the term of this patent is extended or adjusted under 35 U.S.C. 154(b) by 316 days.

(21) Appl. No.: 18/434,979

(22) Filed: Feb. 7, 2024

(65) Prior Publication Data

US 2024/0262180 A1 Aug. 8, 2024

(51) Int. Cl.
*B60K 11/04* (2006.01)

(52) U.S. Cl.
CPC .................................... *B60K 11/04* (2013.01)

(58) Field of Classification Search
CPC ....... B60K 11/04; E02F 9/0866; E02F 9/2029
See application file for complete search history.

(56) References Cited

U.S. PATENT DOCUMENTS

| | | | | |
|---|---|---|---|---|
| 3,970,164 A * | 7/1976 | Suzuki | B60K 11/04 180/69.21 |
| 4,287,961 A * | 9/1981 | Steiger | B62D 25/10 165/137 |
| 4,696,361 A * | 9/1987 | Clark | F28F 9/002 165/41 |
| 6,092,616 A | 7/2000 | Burris et al. | |
| 6,648,088 B2 | 11/2003 | Gabioli | |
| 7,089,994 B2 * | 8/2006 | Esposito | F28F 9/002 165/77 |
| 7,128,178 B1 * | 10/2006 | Heinle | F28D 1/0426 165/41 |
| 7,255,189 B2 * | 8/2007 | Kurtz, Jr. | B60K 11/04 123/41.43 |
| 7,401,672 B2 * | 7/2008 | Kurtz, Jr. | B60K 11/04 180/69.2 |
| 7,753,152 B2 * | 7/2010 | Nakae | F01P 11/10 165/41 |

(Continued)

FOREIGN PATENT DOCUMENTS

| | | |
|---|---|---|
| CN | 107618358 A * | 1/2018 |
| CN | 109296443 A | 2/2019 |

(Continued)

OTHER PUBLICATIONS

GB Search Report related to Application No. 2301708.0; reported on Jul. 31, 2023.

*Primary Examiner* — Jacob B Meyer

(57) ABSTRACT

A support assembly for a radiator of a work machine. The radiator is fluidly coupled to one or more heat sources of the work machine for heat transfer between the radiator and the heat sources. The support assembly includes a structure configured to support the radiator and pivotally move with respect to a main frame of the work machine to facilitate a swinging movement of the radiator between a first position and a second position along a plane, P, defined by a longitudinal axis disposed along a length, L, of the work machine and by a transverse axis disposed along a width, W, of the work machine. In the second position, the radiator clears a path, M, for accessing or removing a power source from the work machine without having to disconnect the radiator from the heat sources of the work machine.

12 Claims, 7 Drawing Sheets

(56) References Cited

U.S. PATENT DOCUMENTS

| | | | | |
|---|---|---|---|---|
| 7,950,443 | B2 * | 5/2011 | Rasset | F28F 9/002 165/41 |
| 8,191,668 | B2 | 6/2012 | Keane et al. | |
| 8,893,834 | B2 * | 11/2014 | Berkeland | E02F 9/0891 296/100.09 |
| 8,960,342 | B2 * | 2/2015 | Werner | B60K 11/04 165/41 |
| 2005/0173095 | A1 * | 8/2005 | Fujita | B60H 1/00378 165/77 |
| 2014/0138066 | A1 * | 5/2014 | Bibb, III | F28F 9/002 165/121 |
| 2024/0262180 | A1 * | 8/2024 | Kemble | B60K 11/04 |

FOREIGN PATENT DOCUMENTS

| | | | | |
|---|---|---|---|---|
| KR | 20210142824 | A | 11/2021 | |
| WO | WO-2023132091 | A1 * | 7/2023 | B60K 11/04 |

* cited by examiner

SUPPORT ASSEMBLY FOR RADIATORS OF WORK MACHINES

CROSS-REFERENCE TO RELATED APPLICATION

This application claims priority under 35 USC § 119 and the Paris Convention to Great Britain Patent Application 2301708.0 filed on Feb. 7, 2023.

TECHNICAL FIELD

The present disclosure relates to a radiator of a work machine. More particularly, the present disclosure relates to a support assembly that helps the radiator clear a path for removing a power source from the work machine without having to disconnect the radiator from any heat source of the work machine.

BACKGROUND

An earth moving work machine, such as a loader machine, is typically applied to engage, alter, and move earth from one location to another location. Such a work machine generally includes multiple devices, such as a power source that helps power and run one or more of the functions of the work machine and a radiator that helps maintain a working temperature of the power source and/or one or more heat sources of the work machine. In some configurations of the work machine, such devices may be arranged one after the other, e.g., in a stacked or a consecutive manner, causing one device to obstruct the other device from ready operator access for repairs and/or replacement.

For example, when an electrical power source, such as a battery, is applied as the power source in the work machine, the radiator can acquire a generally elevated and overlapping position with respect to the power source, thus at least partly obstructing the power source from ready operator access. Therefore, when the power source (and/or one or more parts surrounding the power source) is to be repaired or replaced, the radiator needs to be disconnected from the heat sources and then removed from the machine so that an operator can gain access to the power source and/or to the parts. This process of disconnecting and removing the radiator to access the power source and/or the parts makes repairs and/or replacements of the power source and/or the parts a time consuming and a tedious task. Also, a removal of the radiator may require that the coolant housed or flowing therein be drained off, leading to coolant wastage.

U.S. Pat. No. 6,648,088 discloses a radiator for earth moving machines connected to the engine of the earth moving machine and comprising a first connecting means that pivotally fasten the radiator to the frame, in such a way that the radiator can rotate about its own lower edge from a closed position in which it is approached to the frame to an open position in which it is in part moved away from the frame.

SUMMARY

In one aspect, the disclosure is directed to a support assembly for a radiator of a work machine. The radiator is fluidly coupled to one or more heat sources of the work machine for heat transfer between the radiator and the heat sources of the work machine. The support assembly includes a structure configured to support the radiator and pivotally move with respect to a main frame of the work machine to facilitate a swinging movement of the radiator between a first position and a second position. The swinging movement is facilitated along a plane defined by a longitudinal axis disposed along a length of the work machine and by a transverse axis disposed along a width of the work machine. Further, in the second position, the radiator clears a path for accessing or removing a power source from the work machine without having to disconnect the radiator from the one or more heat sources of the work machine.

In another aspect, the disclosure relates to a work machine. The work machine includes a main frame, an implement operably coupled to the main frame, a power source to power one or more functions of the work machine, a radiator fluidly coupled to one or more heat sources of the work machine for heat transfer between the radiator and the heat sources of the work machine. The work machine also includes a support assembly for the radiator. The support assembly includes a structure for supporting the radiator and pivotally moving with respect to the main frame to facilitate a swinging movement of the radiator between a first position and a second position. The swinging movement is facilitated along a plane defined by a longitudinal axis disposed along a length of the work machine and by a transverse axis disposed along a width of the work machine. Further, in the second position, the radiator clears a path for accessing or removing the power source from the work machine without having to disconnect the radiator from the one or more heat sources of the work machine.

Machines, such as wheel loaders, may use an electric power source to power many of its functions. An electric power source, which may include a battery, may be stacked relatively lower on a frame of the machine, and, more often than not, certain other components, e.g., a radiator, of the machine may occupy a space above (e.g., just above) the power source. In so doing, the components can achieve efficient packaging. However, such packaging obstructs the power source from ready access for repairs and/or replacement.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts.

Figure 1:
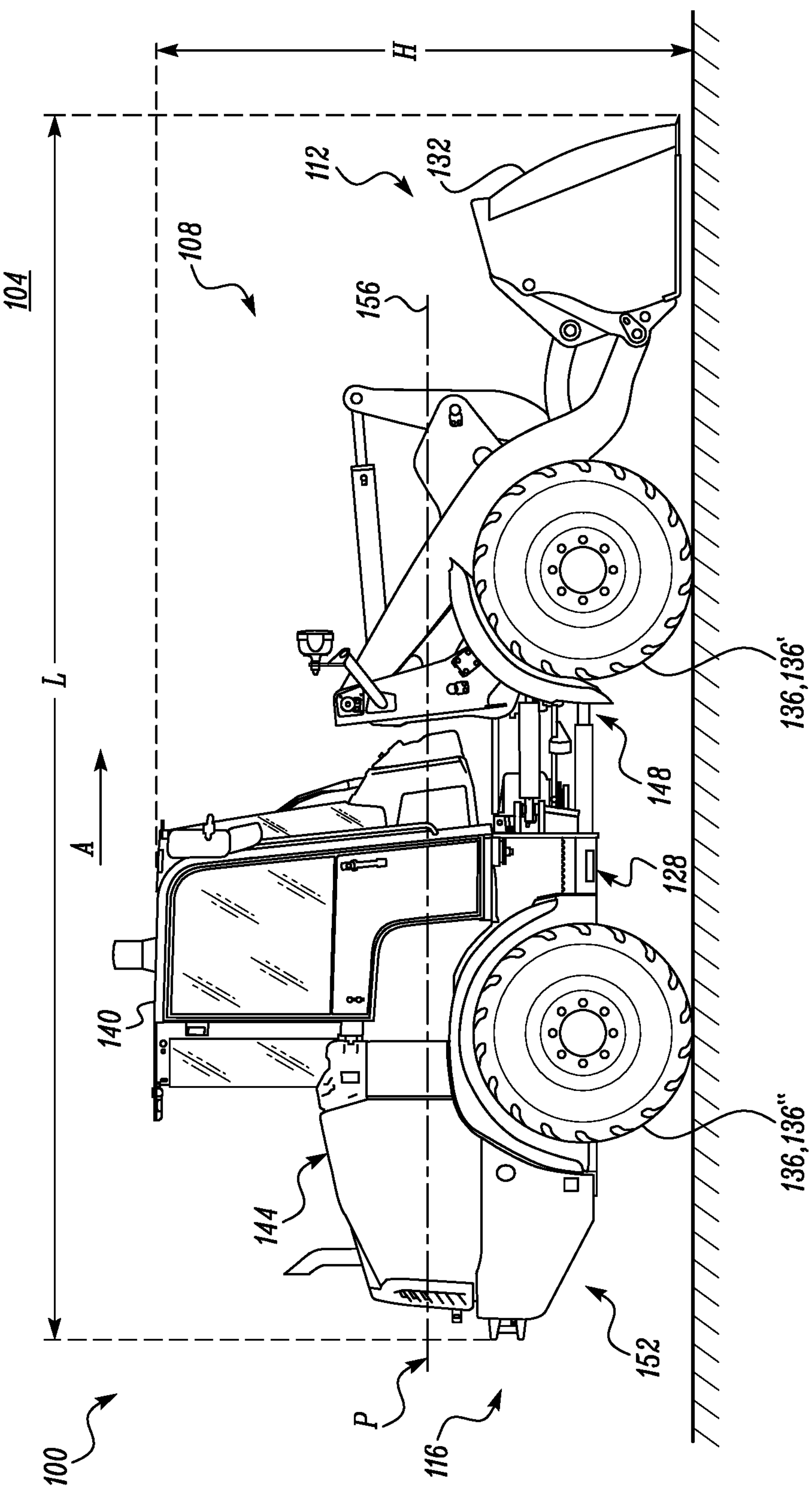
FIG. 1 is a side view of an exemplary work machine, in accordance with an embodiment of the present disclosure.

Referring to FIG. 1 a work machine 100 is exemplarily shown. The work machine 100 may operate at a worksite 104 that may include a mine site, a landfill, a quarry, a construction site, or any other work site. The work machine 100 may be an articulated wheel loader 108 which may be used to transfer materials, e.g., earth, from one location of the worksite 104 to another location of the worksite 104. Aspects of the present disclosure may be applied to various other machines, such as non-articulated wheel loaders, backhoe loaders, skid steer loaders, shovels, haul trucks, dump trucks, excavators, and/or the like, and thus references to the articulated wheel loader 108 may be exemplary. As an example, aspects of the present disclosure may be applied to machine environments where a device, such as a radiator, in its working state, may obstruct any other surrounding device, e.g., a power source, from ready operator access.

The work machine 100 may define a forward end 112 and a rearward end 116. The rearward end 116 may be disposed opposite to the forward end 112. The terms 'forward' and 'rearward' may be defined in relation to an exemplary direction of travel of the work machine 100 (indicated by an arrow, A), with said direction of travel being exemplarily defined from the rearward end 116 towards the forward end 112. Further, the work machine 100 may define a first lateral side 120 (or a left side) and a second lateral side 124 (or a right side) (see FIGS. 2 through 5). The first lateral side 120 may be defined oppositely to the second lateral side 124. Also, the terms 'left' and 'right' may be understood when viewing the work machine 100 from the rearward end 116 towards the forward end 112. Further, the work machine 100 may include a main frame 128, an implement 132, traction devices 136, an operator cabin 140, and a power compartment 144.

Referring to FIGS. 1 through 5, the main frame 128 may exemplarily be a two-piece frame having a forward frame portion 148 and a rearward frame portion 152. The rearward frame portion 152 may be articulable with respect to the forward frame portion 148 to facilitate a steering of the work machine 100 either towards a left direction or a right direction. When the forward frame portion 148 is aligned with respect to the rearward frame portion 152 such that there is no articulation of the forward frame portion 148 with respect to the rearward frame portion 152 and such that the work machine 100 can execute travel in a straight line, a length, L, of the work machine 100 may be defined to extend between the forward end 112 and the rearward end 116. Further, a longitudinal axis 156 of the work machine 100 may be disposed along the length, L, of the work machine 100, as shown in FIG. 1. Moreover, a width, W, of the work machine 100 may be defined to extend between the first lateral side 120 and the second lateral side 124 of the work machine 100. A transverse axis 160 may be disposed along the width, W, of the work machine 100, as shown in FIGS. 2 through 5.

The forward frame portion 148 may accommodate and/or support the implement 132 and one or more of the traction devices 136 (e.g., forward traction devices 136'). The implement 132 may engage, alter, and receive material (e.g., earth), for moving the material to a desired location. Other components and structures may be supported by the forward frame portion 148, as well. The rearward frame portion 152 may accommodate and/or support the operator cabin 140 from where various operations of the work machine 100 and/or the implement 132 may be controlled. Further, the rearward frame portion 152 may accommodate and/or support the power compartment 144 and one or more of the remaining traction devices 136 (e.g., rearward traction devices 136"). Other components and structures may be supported by the rearward frame portion 152, as well. Also, the traction devices 136 may include wheels, although the traction devices 136 may include crawler tracks (not shown) applied either alone or in combination with the wheels.

With regard to the overall layout of the work machine 100, and as an example, the implement 132 may be operably coupled to the main frame 128, e.g., to the forward frame portion 148, and may at least in part define the forward end 112 of the work machine 100; the operator cabin 140 may assume a position in between the forward frame portion 148 and the power compartment 144 of the work machine 100, as shown in FIG. 1; and the power compartment 144 may acquire a rearward position (e.g., a most rearward position) on the work machine 100, thus defining, at least in part, the rearward end 116 of the work machine 100. In some embodiments, portions of the power compartment 144 may serve, at least in part, also as a counterweight of the work machine 100 that may help balance out a weight of a load held by the implement 132 (e.g., when the implement 132 includes a bucket to receive material), during operations of the work machine 100. The power compartment 144 may include (and/or house) various systems and/or devices of the work machine 100. For example, the devices include a power source 164 and a radiator 168 (FIGS. 2 through 5).

The power source 164 may be applied to power various functions of the work machine 100. As an example, the power source 164 may be used to power a mobility of the work machine 100 at the worksite 104—thus, the forward traction devices 136' and the rearward traction devices 136" may be powered by the power source 164. Further, the power source 164 may also provide power to run the implement 132. In some embodiments, the power source 164 may include an electrical power source, e.g., a battery pack, such as a 300 volt (V) battery pack. The power source 164 may sit low in the power compartment 144, e.g., at a relatively low elevation with respect to a height, H, of the work machine (see FIG. 1). During operations, the power source 164 may produce and/or emit heat, and thus the power source 164 may form one of the heat sources of the work machine 100. Notably, apart from the power source 164, the work machine 100 may include multiple other sub-systems and devices which may also form heat sources of the work machine 100.

Given that the power source 164 may form one of the heat sources of the work machine 100, the power source 164 has also been annotated and/or referred to as one of the 'heat sources 172'—see FIGS. 2 through 5. Nonetheless, the reference to 'heat sources 172', as used in the present description, may refer to any one heat source of the work machine 100, multiple heat sources of the work machine 100, or to each of the heat sources of the work machine 100. It may be further understood that references to the 'heat sources 172' may not necessarily include, refer to, or imply a reference, to the power source 164.

The radiator 168 may be exemplarily shifted between two working states—one, a 'normal working state' of the radiator 168, and the other, a 'service state' of the radiator 168. In the normal working state of the radiator 168, the radiator 168 may operate to maintain suitable temperature ranges at one or more of the heat sources 172 (e.g., the power source 164) of the work machine 100 such that those heat sources 172 can function properly within those temperature ranges. As an example, when the power source 164 is working within a suitable working temperature range, the power source 164 may provide a more efficient power supply to one or more power recipients of the work machine 100 (as compared to when the power source 164 is working at a temperature that lies outside the suitable working temperature range).

It may be noted that during a normal working state of the radiator 168, a coolant fluid may extract heat from the heat sources 172 (e.g., the power source 164), be routed to the radiator 168 such that the coolant fluid can be cooled down at the radiator 168, and then the cooled coolant fluid can be re-circulated back to the heat sources 172 to extract further heat from the heat sources 172. Depending upon a requirement, such a cycle of heat extraction may be repeated several times.

Figure 2:
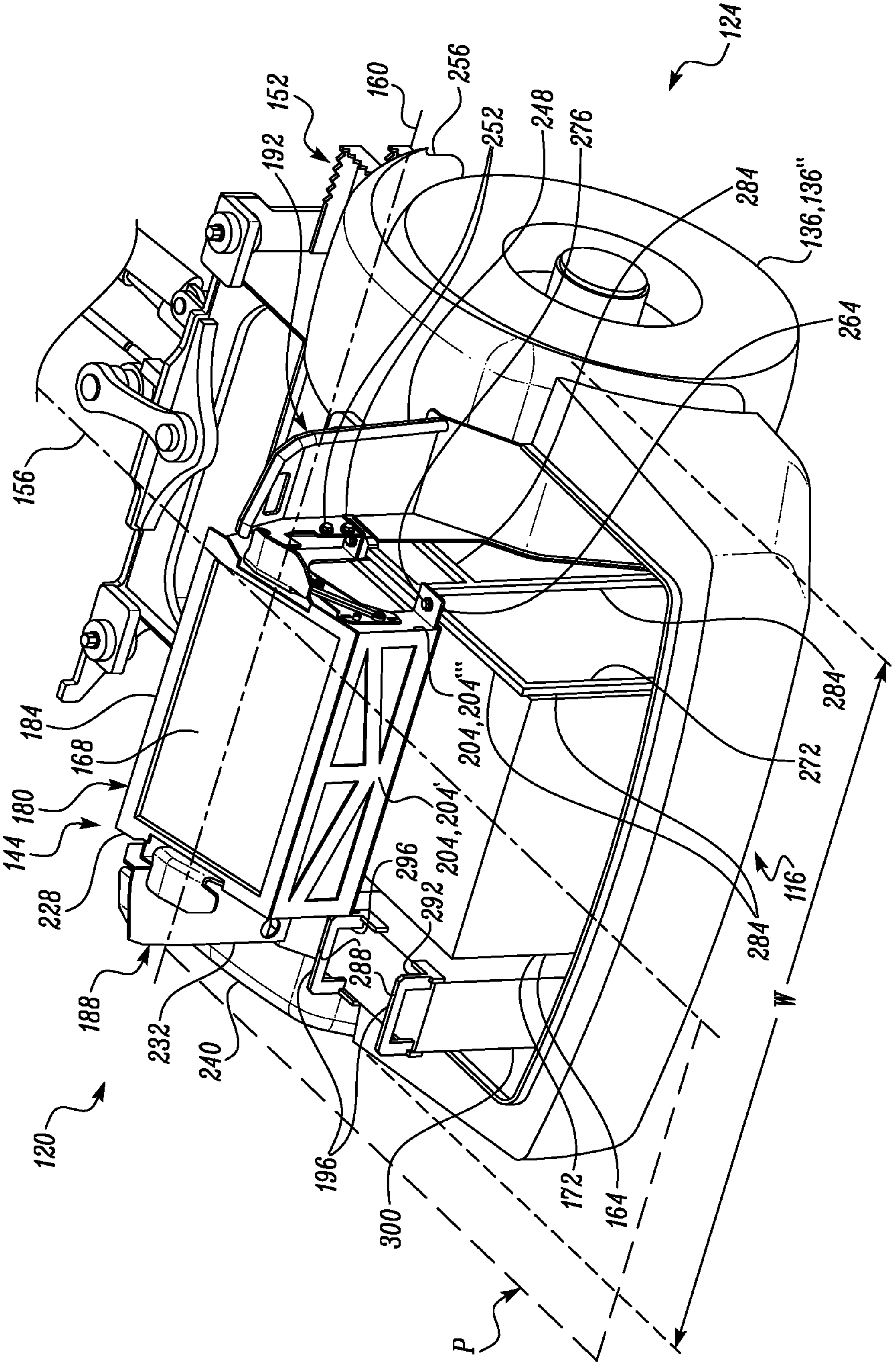
FIG. 2 is a rear perspective view of a portion of the work machine of FIG. 1 illustrating a support assembly for a radiator of the work machine deployed in a first position, in accordance with an embodiment of the present disclosure.

Additionally, during the normal working state of the radiator 168, the radiator 168 may sit above the power source 164 and thus may acquire a generally elevated and/or an overlapping position with respect to the power source 164 (see FIG. 2). This position may correspond to a first position of the radiator 168. In the first position of the radiator 168, the radiator 168 may at least partly block or obstruct the power source 164 from ready operator access—such blockage may be understood by viewing FIG. 2 in which the power source 164 sits under (e.g., directly under) the radiator 168, or, in other words, the radiator 168 sits above (e.g., just above) the power source 164. Effectively, the first position of the radiator 168 may correspond to a position of the radiator 168 in which the radiator 168 operates in the normal working state to perform heat transfer between the radiator 168 and the heat sources 172 (e.g., the power source 164) of the work machine 100 while also blocking the power source 164 from ready operator access.

A connection between the radiator 168 and the heat sources 172 (e.g., the power source 164) may be attained by various fluid lines (e.g., hoses) (not shown) which may be applied between the radiator 168 and the heat sources 172. In so doing, the radiator 168 may be fluidly coupled with the heat sources 172 and a heat transfer between the radiator 168 and the heat sources 172 of the work machine 100 may be attained. The manner in which such coupling can be attained is contemplatable by someone skilled in the art, and thus will not be discussed.

In the service state of the radiator 168, the radiator 168 is moved to a second position. The second position is different from the first position and the same can be visualized by viewing the position of the radiator 168 in FIGS. 3 through 5. More particularly, in the second position, the radiator 168 removes the blockage to the power source 164 and clears a path, M, (see FIG. 3) for accessing or removing the power source 164 from the work machine 100 (or from the power compartment 144 of the work machine 100) without having to disconnect the radiator 168 from the heat sources 172 (e.g., the power source 164) of the work machine 100. According to an aspect of the present disclosure, said movement of the radiator 168 corresponds to a swinging movement, SM, of the radiator (see FIG. 3). In some embodiments, the swinging movement, SM, corresponds to a sweep and/or sway of the radiator 168 through an 80 to 100 degree angle between the first position (see FIG. 2) and the second position (see FIG. 3). Further, the swinging movement, SM, may be executed along a plane, P, defined by the longitudinal axis 156 and the transverse axis 160. In some embodiments, the plane, P, is a horizontal plane passing through the work machine 100. According to an aspect of the present disclosure, the swinging movement, SM, is facilitated by a support assembly 180. Details related to the support assembly 180 shall be discussed hereinafter. The support assembly 180 includes a structure 184, a hinge mechanism 188, a locking mechanism 192, and a resting unit 196.

Figure 6:
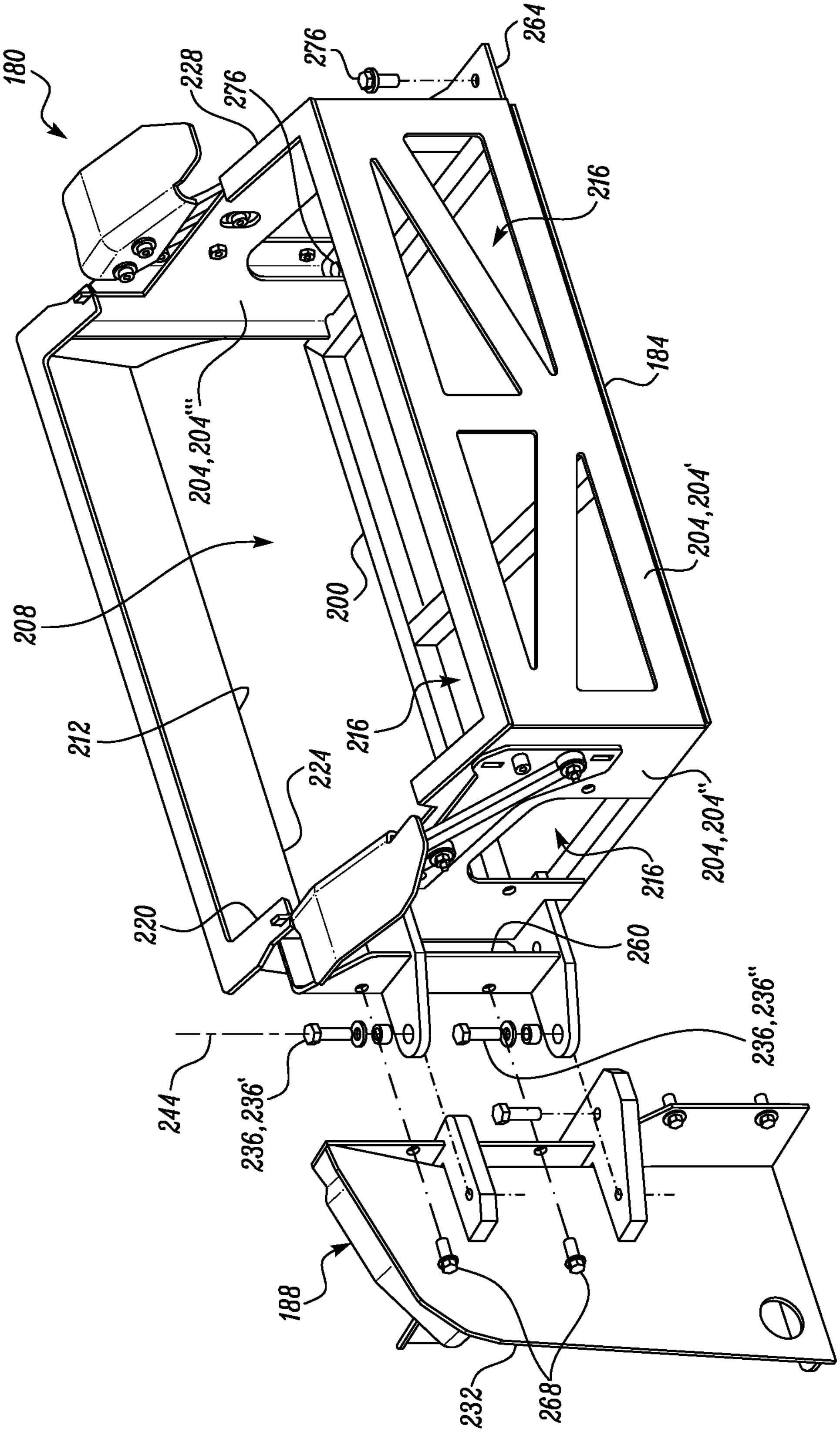
FIG. 6 and FIG. 7 are assembled and exploded views of a portion of the support assembly comprising a hinge mechanism and a structure of the support assembly, in accordance with an embodiment of the present disclosure.
Figure 7:
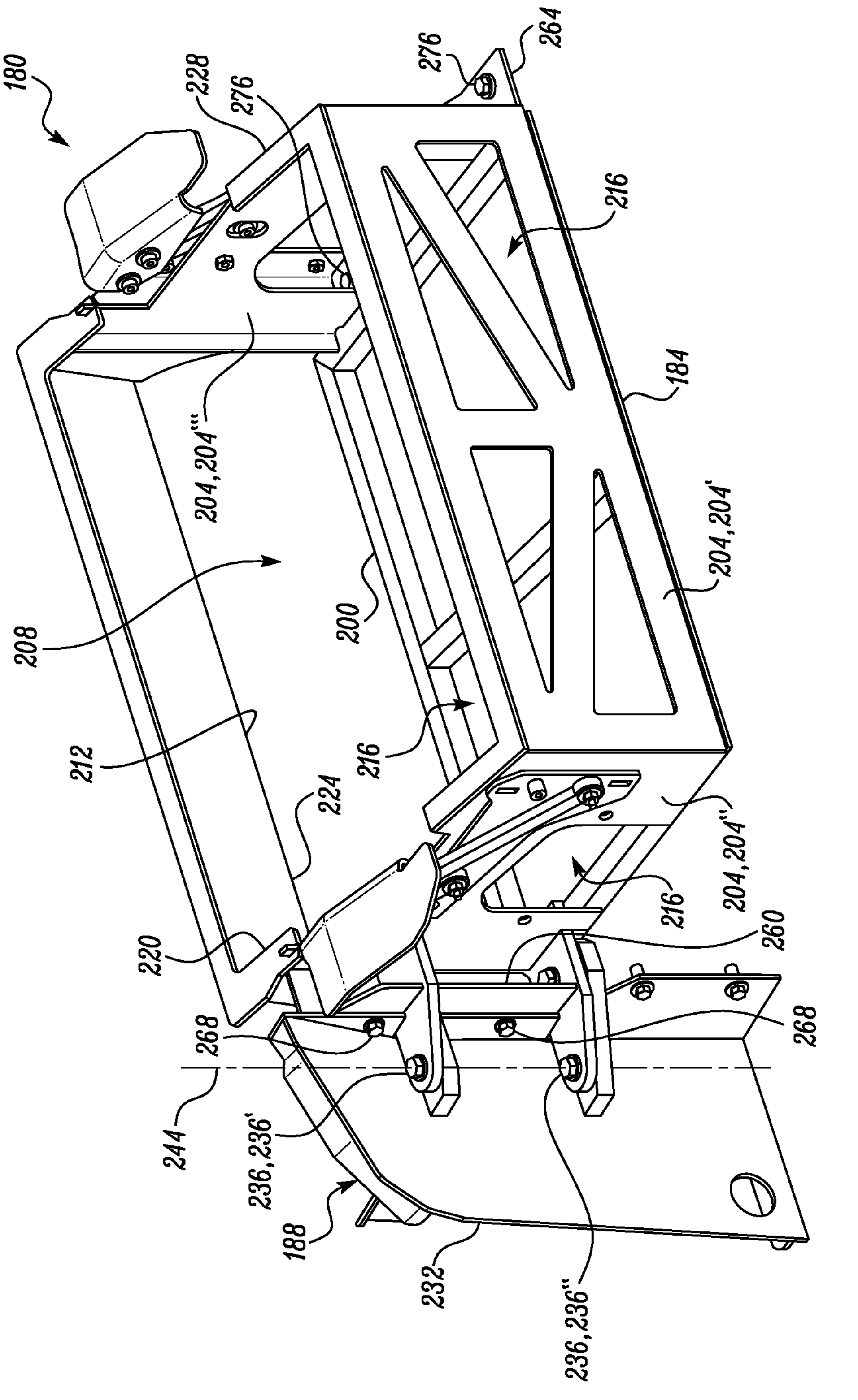

Referring now to FIGS. 6 and 7, and also in conjunction with FIGS. 2 through 5, the structure 184 may house and/or support the radiator 168. The structure 184 may be pivotally coupled with respect to the main frame 128 of the work machine 100 and may pivotally move with respect to the main frame 128 to facilitate the swinging movement, SM, of the radiator 168 between the first position (see FIG. 2) and the second position (see FIG. 3)—with the swinging movement, SM, being executed along the plane, P.

In some embodiments, the structure 184 includes a platform 200 and a series of side walls 204. As a whole, the structure 184 may exemplarily define a cuboidal, rib caged structure. The structure may also define a cavity 208 therewithin, and the side walls 204 may exemplarily surround the cavity 208, e.g., from three sides, as shown. Although not limited, the side walls 204 may extend generally upright with respect to the platform 200—the term 'generally' as used here may imply that one or more of the side walls 204 may define an angle between 85 degrees to 95 degrees with respect to the platform 200. As an example, the side walls 204 may correspond to a rearward side wall 204", a first lateral side wall 204", and a second lateral side wall 204'", as illustrated.

Alternatively, the structure 184 can take various other profiles, shapes, and/or sizes. In some embodiments, a shape and/or a size of the structure 184 may be based on the shape, profile, and/or size of the radiator 168. Also, the cavity 208 may define interior confines that comply with a shape of the radiator 168 so as to house the radiator 168 within the structure 184. Further, the structure 184 may define a mouth 212 through which the cavity 208 may be readily accessed, and, in some embodiments, the structure 184 may receive the radiator 168 into the cavity 208 through the mouth 212. According to an example, the mouth 212 may be formed at a side (e.g., a forward side) of the structure 184 where the side walls 204 are absent, although the mouth 212 may be defined on other portions of the structure 184.

Although not limited, each of the rearward side wall 204', the first lateral side wall 204", the second lateral side wall 204 and the platform 200 may define one or more openings 216 (only few openings 216 are marked) therein that allow air to pass freely into and out of the cavity 208 to potentially aid radiator functioning. In some embodiments, and as shown, a roof covering may be omitted from the structure 184, and instead an aperture 220 may be defined—said aperture 220 can also allow air to pass freely into and out of the cavity 208 to aid radiator functioning.

The various parts of the structure 184, e.g., the platform 200 and the side walls 204, may be formed from sheet metal (e.g., high-strength sheet metal that can support a weight and/or bulk of the radiator 168) and then they can be joined together (e.g., by welding) to form the structure 184. Further, the radiator 168 may be restrained within the cavity 208 through one or more restraining means (not shown) so that the radiator 168 may be prevented from misplacements during machine movement and/or operation. The structure 184 may include additional (but optional) features, such as a louver 224 formed above the mouth 212 to guard or screen the radiator 168 when the radiator 168 is housed within the structure 184 and a strip 228 (e.g., a metallic strip) positioned atop the side walls 204, remote and away from the platform 200, for providing rigidity. Such optional features are not discussed further to maintain brevity of description.

Figure 3:
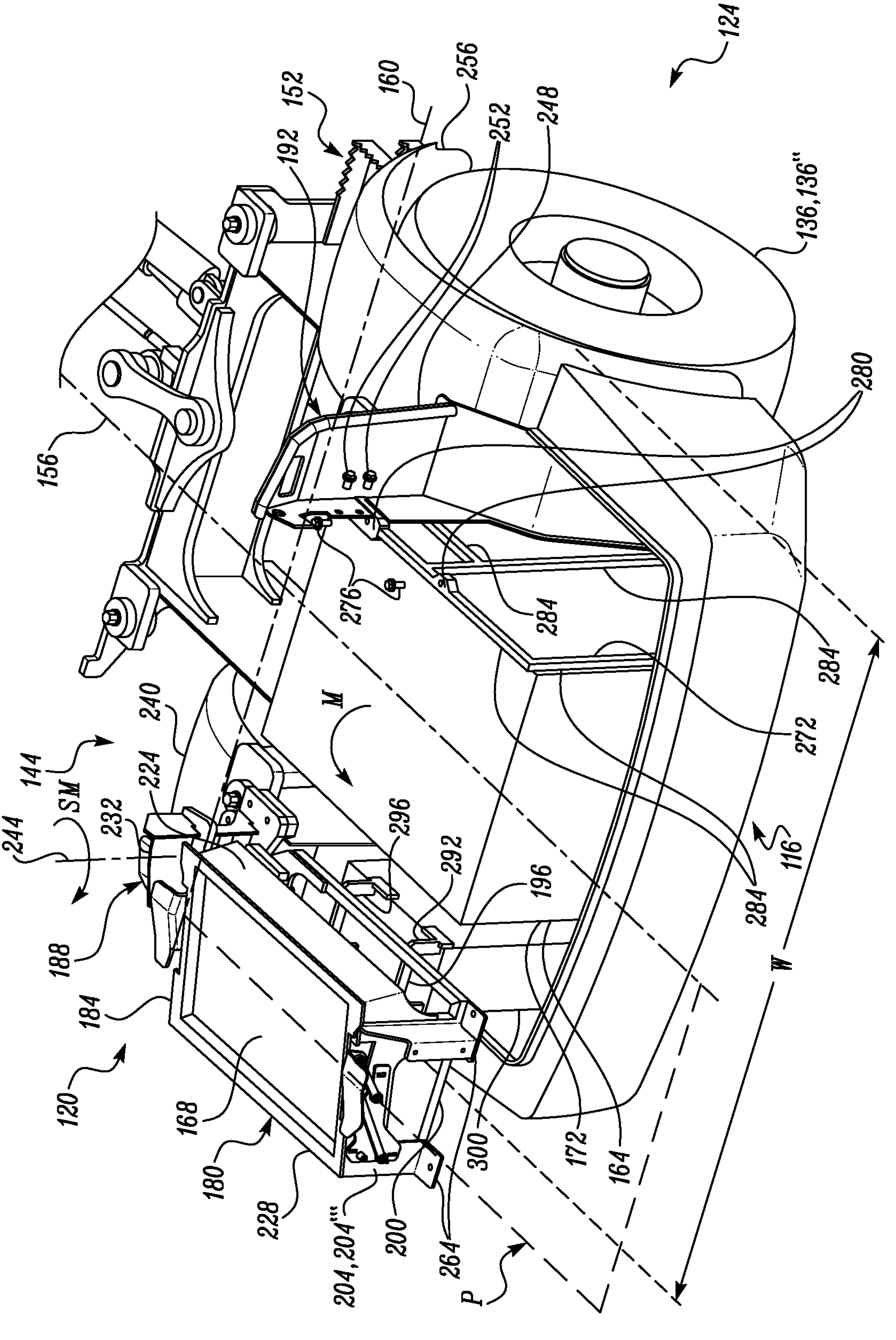
FIG. 3 is a rear perspective view of the work machine of FIG. 1 illustrating the support assembly and the radiator deployed in a second position, in accordance with an embodiment of the present disclosure.
Figure 4:
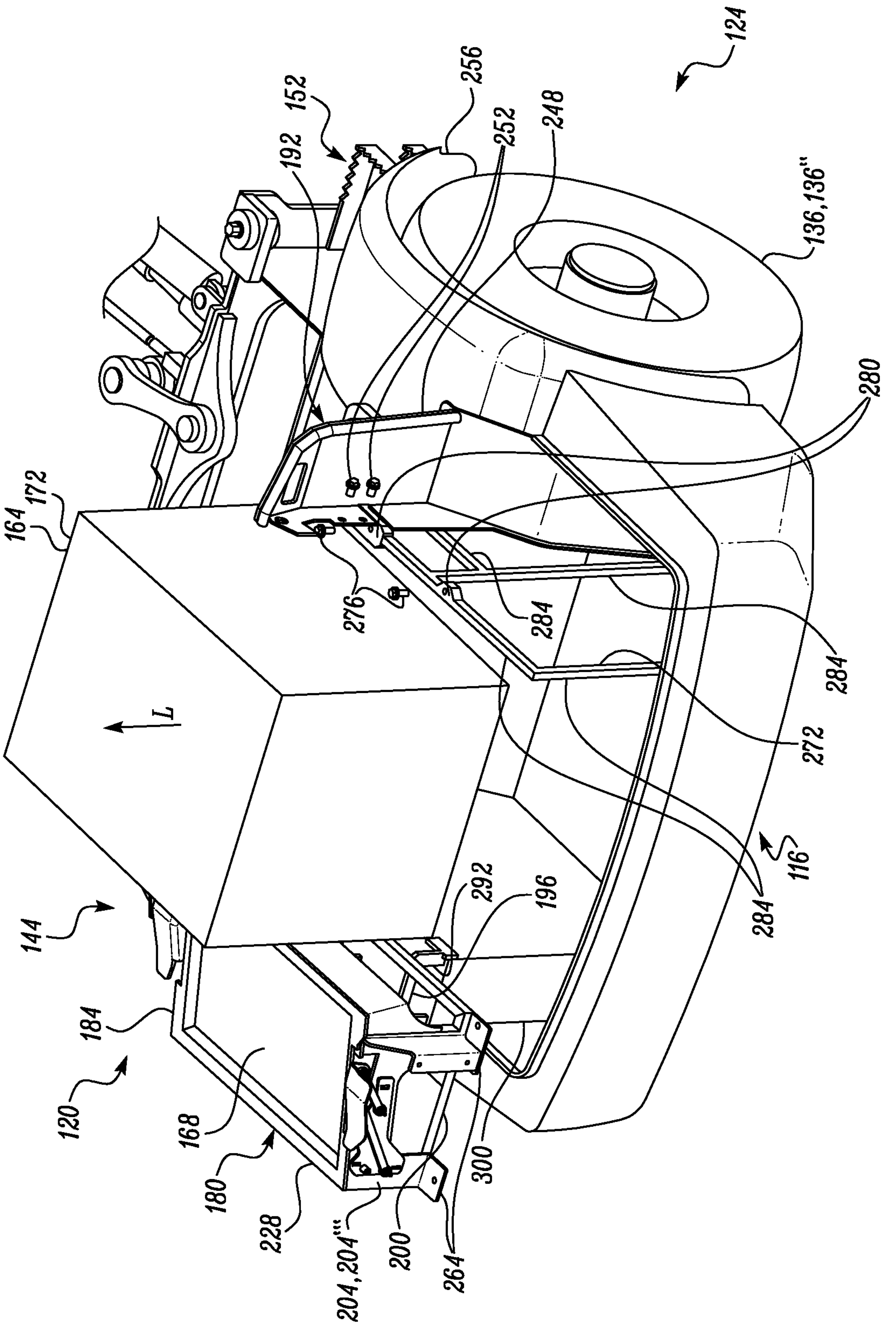
FIG. 4 and FIG. 5 illustrates an exemplary stepwise process to remove a power source of the work machine when the radiator is in the second position, in accordance with an embodiment of the present disclosure.
Figure 5:
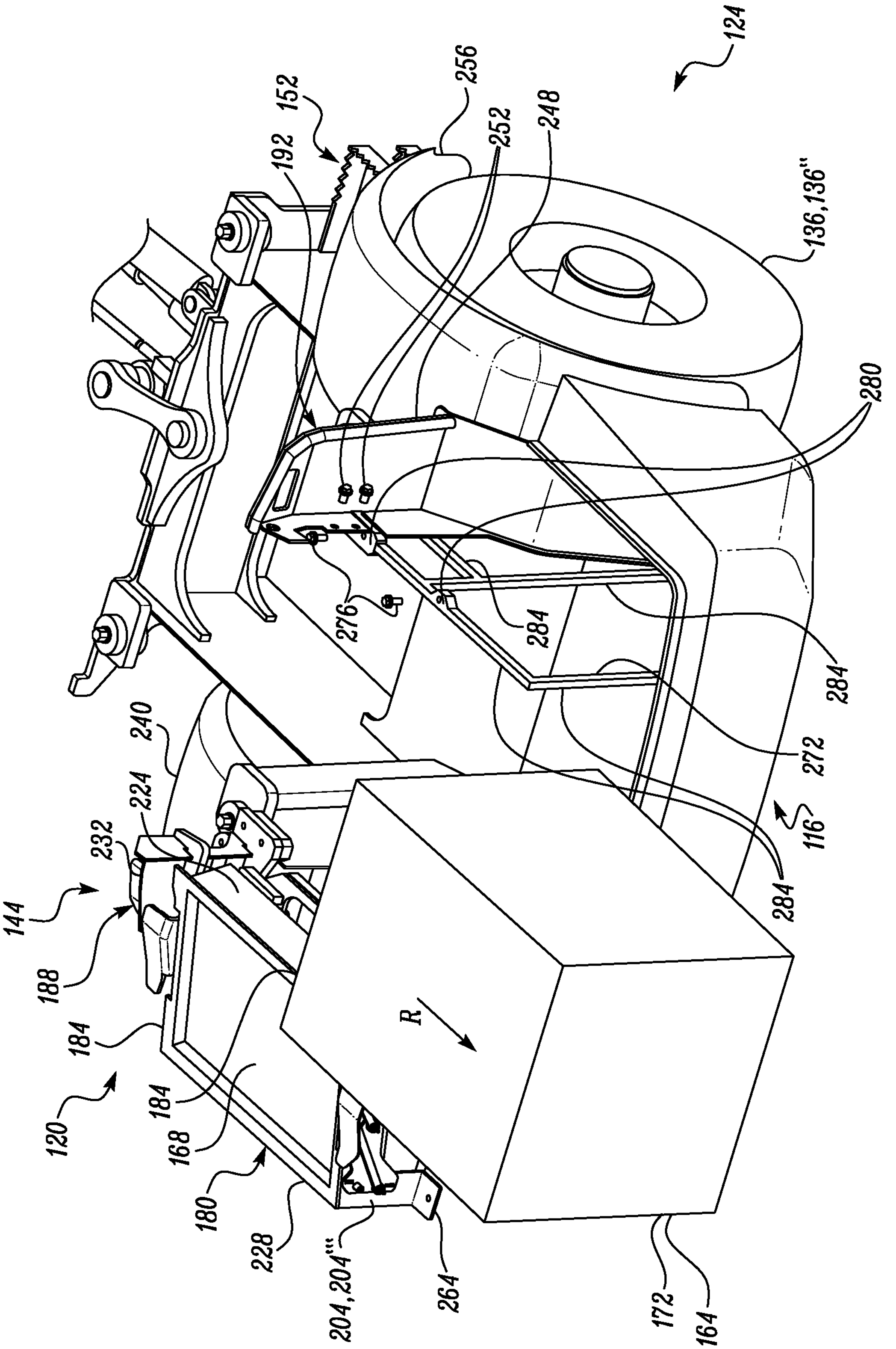

With continued reference to FIGS. 6 and 7, the hinge mechanism 188 may be configured to enable the pivotal movement of the structure 184 with respect to the main frame 128 and thus facilitate the swinging movement, SM, of the radiator 168 between the first position (see FIG. 2) and the second position (see FIG. 3). The hinge mechanism 188 includes a first bracket 232 and one or more hinge pins 236 (e.g., a first hinge pin 236' and a second hinge pin 236''). The first bracket 232 may be immovably coupled (e.g., by welding and/or bolting) with respect to the main frame 128 of the work machine 100—as an example, the first bracket 232 may be coupled to a mudguard 240 (see FIGS. 2 and 3) of the work machine 100 disposed on the first lateral side 120 and on the rearward frame portion 152 of the main frame 128. The hinge pins 236 may be configured to be engaged with each of the first bracket 232 and the structure 184 such that the hinge pins 236 may define a common hinge axis, i.e., a hinge axis 244 (see FIGS. 3 and 7), about which the structure 184 can execute a pivotal movement with respect to the main frame 128, thus facilitating the swinging movement, SM, of the radiator 168 between the first position (see FIG. 2) and the second position (see FIG. 3) along plane, P. Use of additional hinge pins, such as hinge pins 236, may be contemplated.

Referring again to FIG. 2, the locking mechanism 192 may be configured to lock the structure 184 with the main frame 128 such that the radiator 168 can be locked and retained in the first position (see FIG. 2). The locking mechanism 192 includes a second bracket 248 and one or more locking pins (e.g., see first locking pins 252 which may be two in number). The second bracket 248 may be immovably coupled (e.g., by welding and/or bolting) with respect to the main frame 128. For example, the second bracket 248 may be coupled with a mudguard 256 of the work machine 100 disposed on the second lateral side 124 and on the rearward frame portion 152 of the main frame 128. The locking pins (e.g., the first locking pins 252) may be configured to be engaged with the second bracket 248 and the structure 184 to lock and retain the radiator 168 in the first position (see FIG. 2).

Referring to FIGS. 6 and 7, and in some embodiments, the structure 184 defines various engagement portions—e.g., see a first engagement portion 260 and a second engagement portion 264 as part of the locking mechanism 192, and the locking mechanism 192 can include additional locking pins to enhance a locking of the engagement portions (and thus of the structure 184) with the main frame 128 in the first position of the radiator 168. For example, the locking mechanism 192 can include second locking pins 268 (which may be two in number) that can be engaged with the first engagement portion 260 and the first bracket 232 to lock and retain the structure 184 and thus the radiator 168 in the first position (see FIG. 2).

Referring again to FIGS. 2 through 5, and in conjunction with FIGS. 6 and 7, the locking mechanism 192 may include a mounting frame 272 and further locking pins (e.g., third locking pins 276 which may be two in number). The third locking pins 276 may be engaged with the mounting frame 272 and the second engagement portion 264 to lock and retain the structure 184 and thus the radiator 168 in the first position (see FIG. 2). It may be noted that the mounting frame 272 may provide a mounting surface 280 (see FIGS. 3 through 5) for the radiator 168 on which the radiator 168 can sit on and be mounted onto in the first position of the radiator 168 to retain the radiator 168 in the first position. With regard to the mounting frame 272, the mounting frame 272 may be coupled (e.g., immovably coupled by welding) with respect to the main frame 128. The mounting frame 272 may be exemplarily formed by interlinking multiple beams 284 to form a rigid, high-strength assembly that can take a weight of the radiator 168 and the structure 184 when the radiator 168 and the structure 184 sit on the mounting frame 272 in the first position of the radiator 168 (see FIG. 2).

The resting unit 196 may be configured to be immovably coupled with respect to the main frame 128 and may provide a resting surface 288 (see FIG. 2) for the radiator 168 in the second position of the radiator 168. In some embodiments, as the structure 184 pivotally moves with respect to the main frame 128 from the first position of the radiator 168 towards the second position of the radiator 168, and before the structure 184 may forego its contact or engagement with the mounting frame 272, the structure 184 may come into contact with the resting unit 196 so as to gain and retain support from below. In some embodiments, the resting unit 196 includes a first support plate 292 and a second support plate 296, and the structure 184 (housing the radiator 168) may be positioned fully atop the first support plate 292 and the second support plate 296 in the second position of the radiator 168. As shown, the first support plate 292 and the second support plate 296 may be positioned spaced apart from each other. Although not limited, the first support plate 292 and the second support plate 296 may be mounted and/or coupled (e.g., by welding) atop any device within the power compartment 144—as an example, and as shown, the device may include a hydraulic tank 300.

INDUSTRIAL APPLICABILITY

During a servicing operation when there is a need to access or to remove the power source 164 (e.g., to replace the power source 164 with a new power source) or to repair or replace any component around the power source 164, an operator may first open the power compartment 144 to gain access into the power compartment 144. Once an interior of the power compartment 144 is accessed, the operator may reach out to the locking mechanism 192, and, more particularly, to the first locking pins 252 (see FIG. 2) so as to remove the first locking pins 252 from its engagement with the second bracket 248 and the structure 184. If the second locking pins 268 are also engaged with the first engagement portion 260 and the first bracket 232 and the third locking pins 276 are also engaged with the mounting frame 272 and the second engagement portion 264, the operator may also remove the second locking pins 268 from its engagement with the first engagement portion 260 and the first bracket 232 and also remove the third locking pins 276 from its engagement with the mounting frame 272 and the second engagement portion 264. In that manner, the operator may unlock the structure 184 and thus the radiator 168 from the first position (see FIG. 2).

Having unlocked the structure 184 and/or the radiator 168, the structure 184 may be free to pivotally move with respect to the main frame 128 about the hinge axis 244 (see FIGS. 3, 6, and 7) and thus, also the radiator 168 may be free to execute the swinging movement, SM, along the plane, P (also about the hinge axis 244). Accordingly, the operator may pivotally move or turn the structure 184 and thus swing the radiator 168 about the hinge axis 244 such that the radiator 168 is able to move along the plane, P. In so doing, the radiator 168 moves away from the first position. In some embodiments, as soon as the structure 184 and/or the radiator 168 forgoes contact with the mounting frame 272 during the swinging movement, SM, from the first position towards the second position, a part of the structure 184 and/or the radiator 168 may find support over the resting unit 196. In that manner, a weight of the structure 184 and/or the radiator 168 may be supported from below, and said support may be present at least for the most part of the swinging movement, SM. The operator may turn the structure 184 and/or swing the radiator 168 until the radiator 168 attains the second position (see FIG. 3).

Once the second position is achieved, the radiator 168 clears the path, M, (see FIG. 3) for accessing or removing the power source 164 from the power compartment 144 of the work machine 100. A removal of the power source 164 from the power compartment 144 of the work machine 100 may exemplarily include a lifting of the power source 164 (see direction, L, FIG. 4) and a moving of the power source 164 in a rearward direction (see direction, R, FIG. 5). It may be noted that for moving the radiator 168 from the first position to the second position, the radiator 168 is not required to be disconnected from any of the heat sources 172. Conversely, various connections (e.g., fluid connections) of the radiator 168 to the heat sources 172 may remain connected throughout the swinging movement, SM, between the first position and the second position. Effectively, in the second position of the radiator 168, the radiator 168 clears the path, M, for accessing or removing the power source 164 from the power compartment 144 of the work machine 100 without having to disconnect the radiator 168 from the heat sources 172 of the work machine 100. A manner by which connections (e.g., fluid connections) between the radiator 168 and the heat sources 172 may be routed such that the connections remain intact and unaffected throughout the swinging movement, SM, may change from application to application and the same may be optimized and/or contemplated by someone in the art. Therefore, the manner of routing connections between the radiator 168 and the heat sources 172 is not discussed.

The support assembly 180 provides for the radiator 168 to pivotally move in a horizontal plane, i.e., plane, P, and thus provides for an easy way for operators to readily (i.e., in a time efficient manner) access and/or remove the power source 164 without disconnecting the radiator 168 from the heat sources 172. Given that there is no disconnection of the radiator 168 from the heat sources 172, a draining of a coolant fluid (passing between the radiator 168 and the heat sources 172) is not needed, minimizing loss of coolant fluid, service costs, and labour. Notably, the support assembly 180 may also be useful to gain access and/or remove devices other than the power source 164—e.g., devices that may surround the power source 164; be associated with a working of the power source 164; or be generally positioned under the radiator 168. Further, the support assembly 180 is simple in construction and adds negligible weight or bulk to the work machine 100 and in no way interferes with a general working of the work machine 100.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. A support assembly for a radiator of a work machine, the radiator fluidly coupled to one or more heat sources of the work machine for heat transfer between the radiator and the one or more heat sources of the work machine, the support assembly comprising:

a structure configured to support the radiator and pivotally move with respect to a main frame of the work machine to facilitate a swinging movement of the radiator between a first position and a second position, wherein the swinging movement is facilitated along a plane, P, defined by a longitudinal axis disposed along a length, L, of the work machine and by a transverse axis disposed along a width, W, of the work machine, and in the second position, the radiator clears a path, M, for accessing or removing a power source from the work machine without having to disconnect the radiator from the one or more heat sources of the work machine; and a resting unit configured to be immovably coupled with respect to the main frame and provide a resting surface for the radiator in the second position of the radiator.

2. The support assembly of claim 1 further including:

a hinge mechanism including a first bracket and one or more hinge pins, the first bracket being immovably couplable to the main frame, the one or more hinge pins configured to be engaged with the first bracket and the structure such that the one or more hinge pins define a common hinge axis about which the structure executes a pivotal movement to facilitate the swinging movement of the radiator between the first position and the second position.

3. The support assembly of claim 1 further including:

a locking mechanism including a second bracket and one or more locking pins, the second bracket being immovably couplable to the main frame, the one or more locking pins configured to be engaged with the second bracket and the structure to retain the radiator in the first position.

4. The support assembly of claim 3, wherein the locking mechanism further includes a mounting frame configured to be coupled to the main frame and provide a mounting surface for the radiator in the first position of the radiator.

5. The support assembly of claim 1, wherein, in the first position, the radiator operates in a normal working state to perform heat transfer between the radiator and the one or more heat sources of the work machine.

6. The support assembly of claim 1, wherein the power source is an electrical power source.

7. A work machine, comprising:

a main frame;

an implement operably coupled to the main frame;

a power source to power one or more functions of the work machine;

a radiator fluidly coupled to one or more heat sources of the work machine for heat transfer between the radiator and the one or more heat sources; and a support assembly for the radiator, the support assembly including:

a structure to support the radiator and pivotally move with respect to the main frame to facilitate a swinging movement of the radiator between a first position and a second position, wherein the swinging movement is facilitated along a plane, P, defined by a longitudinal axis disposed along a length, L, of the work machine and by a transverse axis disposed along a width, W, of the work machine, and in the second position, the radiator clears a path, M, for accessing or removing the power source from the work machine without having to disconnect the radiator from the one or more heat sources of the work machine; and a resting unit configured to be immovably coupled with respect to the main frame and provide a resting surface for the radiator in the second position of the radiator.

8. The work machine of claim 7 further including:

a hinge mechanism including a first bracket and one or more hinge pins, the first bracket being immovably coupled to the main frame, the one or more hinge pins being engaged with the first bracket and the structure such that the one or more hinge pins define a common hinge axis about which the structure executes a pivotal movement to facilitate the swinging movement of the radiator between the first position and the second position.

9. The work machine of claim 7 further including:

a locking mechanism including a second bracket and one or more locking pins, the second bracket being immovably coupled to the main frame, the one or more locking pins being engaged with the second bracket and the structure to retain the radiator in the first position.

10. The work machine of claim 9, wherein the locking mechanism further includes a mounting frame coupled to the main frame and provide a mounting surface for the radiator in the first position of the radiator.

11. The work machine of claim 7, wherein, in the first position, the radiator operates in a normal working state to perform heat transfer between the radiator and the one or more heat sources of the work machine.

12. The work machine of claim 7, wherein the power source is an electrical power source.

* * * * *